United States Patent [19]
Zetts

[11] Patent Number: 5,272,470
[45] Date of Patent: Dec. 21, 1993

[54] APPARATUS AND METHOD FOR REDUCING SYSTEM OVERHEAD WHILE INKING STROKES IN A FINGER OR STYLUS-BASED INPUT DEVICE OF A DATA PROCESSING SYSTEM

[75] Inventor: John M. Zetts, Falls Church, Va.

[73] Assignee: International Business Machines Corporation, Armonk, N.Y.

[21] Appl. No.: 775,645

[22] Filed: Oct. 10, 1991

[51] Int. Cl.$^5$ ............................................. G09G 3/02
[52] U.S. Cl. .................................. 345/173; 178/18; 382/23
[58] Field of Search ............ 340/712, 706, 707, 708; 178/18, 19; 382/3, 13, 23, 24, 60

[56] References Cited

U.S. PATENT DOCUMENTS

| | | | |
|---|---|---|---|
| 4,177,354 | 12/1979 | Mathews | 178/18 |
| 4,277,783 | 7/1981 | Sampieri et al. | 340/707 |
| 4,550,438 | 10/1985 | Convis et al. | 178/18 |
| 4,633,436 | 12/1986 | Flurry | 340/707 |
| 4,675,665 | 6/1987 | Halliwell | 340/706 |
| 4,686,332 | 8/1987 | Greanias et al. | 340/706 |
| 4,697,175 | 9/1987 | MacDonald | 340/707 |
| 4,754,267 | 6/1988 | Reynolds et al. | 340/709 |
| 4,814,760 | 3/1989 | Johnston et al. | 340/706 |
| 4,972,496 | 11/1990 | Sklarew | 178/18 |
| 5,007,085 | 4/1991 | Greanias et al. | 340/706 |
| 5,016,008 | 5/1991 | Gruaz et al. | 340/706 |
| 5,025,411 | 6/1991 | Tallman et al. | 340/706 |

FOREIGN PATENT DOCUMENTS 1304587 12/1989 Japan.

*Primary Examiner*—Alvin E. Oberley
*Assistant Examiner*—Regina Liang
*Attorney, Agent, or Firm*—Jeffrey S. LaBaw; John E. Hoel

[57] ABSTRACT

The present invention reduces overhead processing of a data processing system by storing a predetermined number of points corresponding to the position of a pointing device as it moves on a workpad or other touch sensitive input device. A predetermined number of points are stored in a buffer, wherein the predetermined number is dependent upon the type of pointing device (e.g., finger, stylus, etc.) used with the workpad. The stored points are periodically displayed or inked on a visual display at a rate of at least 20 times per second. As a result, the user moving the pointing device receives both tactile and visual feedback information similar to that provided by a pencil used to make markings on a piece of paper. An alternative embodiment provides a similar reduction of overhead associated with erasing graphical information displayed on the visual display.

6 Claims, 8 Drawing Sheets

APPARATUS AND METHOD FOR REDUCING SYSTEM OVERHEAD WHILE INKING STROKES IN A FINGER OR STYLUS-BASED INPUT DEVICE OF A DATA PROCESSING SYSTEM

TECHNICAL FIELD

This invention relates generally to input devices for use with a data processing system. More particularly, it relates to an apparatus and method for reducing the system overhead devoted to inking a series of points on a system display which depict the path of a pointing device cursor across the display. More specifically, the invention reduces the system overhead.

BACKGROUND ART

The use of a touch input device disposed over the viewing surface of a computer display to provide a "user friendly" means for the control of a data processing system is well known in the art. For example, U.S. Pat. No. 5,016,008 to Gruaz et al. describes a touch-sensitive pad that is used to input information regarding the position of a pointer on a video screen of a computer. Also, U.S. Pat. No. 5,025,411 to Tallman et al. describes a touch-sensitive screen on an oscilloscope for allowing the user to select menu options with a touch of a finger. These devices are designed to allow an unsophisticated user to perform desired tasks on a computer system without extensive training. Human factor studies have shown that an input device which allows the user to input the data directly on the computer display achieves greatest immediacy and accuracy between man and machine. Such a device is generally known in the art as a touch input device.

In the current graphical user interfaces developed to aid man/machine interaction, there are many items, such as menu selections, icons or windows which a user can most easily select by the touch of a finger. Other means of selecting these items are known to the art, either with a mouse pointing device, or with a light pen, which is a pointing device developed for use on cathode ray tubes (CRT monitors) as disclosed in U.S. Pat. No. 4,697,175 to Macdonald and Japanese Laid-Open Patent Application No. 01304587. In other advanced software applications which perform freehand drawing, gesture or motion recognition or handwriting capture, a stylus is more effective because of its greater precision. U.S. Pat. No. 4,754,267 to Reynolds et al., U.S. Pat. No. 4,814,760 to Johnston et al., and U.S. Pat. No. 5,007,085 each disclose a stylus used as a pointing device on a tablet or workpad for input to a computer system. Thus, it would be convenient to utilize a touch input system which allows both stylus and finger touch detection. One such system is described in commonly assigned U.S. Pat. No. 4,686,332, to Greanias et al., entitled "Combined Finger Touch and Stylus Detection System For Use On The Viewing Surface Of A Visual Display Device", and which is hereby expressly incorporated herein by reference.

Unlike a mouse pointing device where the user is not necessarily interested in the path which has taken the mouse pointer to its current position, a stylus with a touch input device is generally used to generate input information resembling handwriting or freehand drawing. U.S. Pat. Nos. 4,177,354 to Mathews, 4,277,783 to Sampieri et al., 4,550,438 to Convis et al. and 4,972,496 to Sklarew all describe attempts to simulate handwriting or freehand drawing using a pointing device. As the user makes strokes on the touch input device, there is displayed an "ink" trail which simulates the strokes made by a pen on paper. The ink trail thus provides feedback and aids the user in directing the stroke. U.S. Pat. No. 4,675,665 to Halliwell describes computing the positional data of the stylus and updating the ink trail display after each refresh cycle of the display screen. Such stylus-driven touch input devices typically generate a large number of points per second (p/s), which has the effect of creating a high CPU overhead due to the frequent invocation of the inking software subroutine. Due to the high CPU overhead, it is not unusual for the ink trail to lag far behind the tip of the stylus since the points are generated faster than the software can ink them.

SUMMARY OF THE INVENTION

It is an object of the invention to reduce CPU overhead associated with inking the path of a pointing device across the viewing surface of a display.

It is another Object of the invention to distinguish between different input devices which input points to an operating system controlling the CPU at different rates.

It is a further object of the invention to distinguish between proximity and contact points, and, depending on the context in which the proximity points are sensed, to determine whether or not the proximity points should be inked.

The above and other objects and features are accomplished by an apparatus and a method for reducing the processing time required for inking a set of points on a display representing the path of a pointing device across the display. A buffer is used to store multiple points up to a predetermined number in response to a determination that the pointing device has begun to move across the display. When the predetermined number of points is stored, the buffered points are then inked to the screen in a single invocation of the inking routine. The number of points stored in the buffer is established by the rate at which a particular pointing device is capable of generating coordinate points. Thus, the number of buffered points generated by a stylus will differ from the number generated by use of a finger.

The user does not detect the interruption of the inking process of the stroke as the inking is performed because the invocation occurs at a minimum rate of 20 times per second, which is too fast for the human eye to detect. If uninked points are buffered when the pointing device terminates movement (e.g., lifts off the touch device), the points in the buffer are immediately inked to complete the inking of the stroke, irrespective of the number stored.

The invention also provides for reducing the overhead associated with erasing an ink trail when the points in the path of an eraser have been buffered for a predetermined period of time; then, the image corresponding to the path is erased from the display in a single invocation of an eraser routine. As the eraser routine is usually accomplished with a wide stroke width, the overhead allocated in the prior art to erasing is much larger than overhead required in the inking routine which involves only the width of a single picture element (pel).

BRIEF DESCRIPTION OF THE DRAWINGS

The above objects, features and improvements can be better understood with reference to the following drawing figures.

DESCRIPTION OF THE PREFERRED EMBODIMENT

Figure 1:
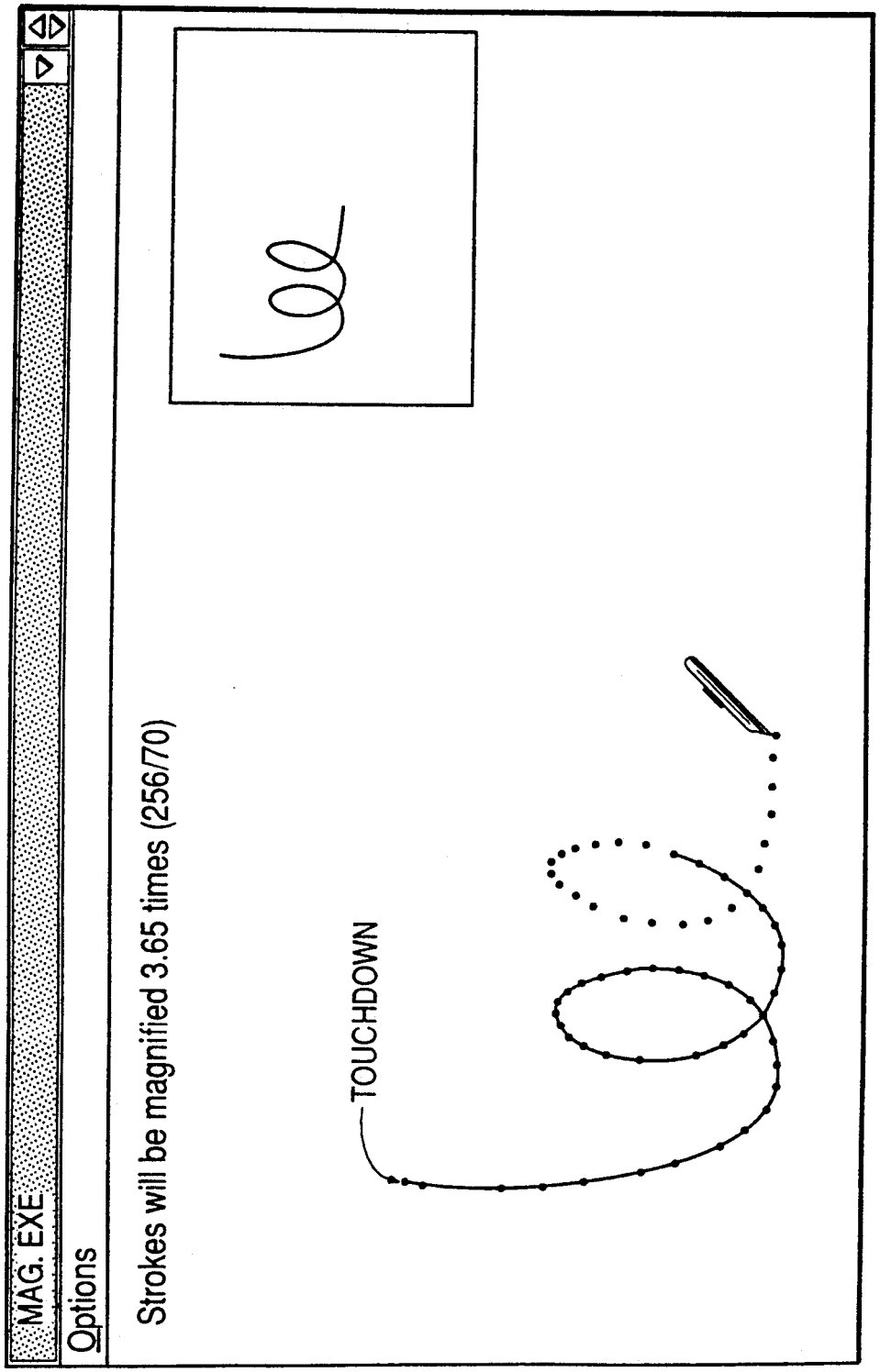
FIG. 1 depicts a prior art system wherein there is a lag between the inking of the path and the rate of movement of a stylus across a touch input device disposed on the viewing surface of a display.

FIG. 1 is a diagram of a stroke on a prior art system where a user contacts or "touches down" on the touch input device and begins to draw a series of open loops or cursive "l's." A stroke is a single movement made by a user interface pointing device, such as a finger or stylus, on a sensor or touch sensitive input device that detects both the contact and loss of contact of the pointing device. Strokes are a significant part of user interaction in a finger- or stylus-based system. The strokes provide visual feedback in addition to the tactile feedback produced by the touching and movement of the pointing device. The stylus and the input device generate points at such a rapid rate that the controlling software cannot display ("ink") them on the display rapidly enough to avoid the situation where the stylus gets ahead of the inking.

Many touch screen technologies can sense the presence of the stylus in close proximity to the sensor prior to actual contact. Because these pre-contact or proximity points are useful, they are passed to the software application as input points. Touch input devices sensitive to pressure may also generate proximity points between the time a finger initially touches the device and the time when the amount of pressure reaches a preset threshold, known as the "button down threshold."

Proximity points become problematic at the end of a stroke when the pointing device has lifted off the screen, but the input device continues to generate points. Some technologies cannot accurately detect loss of contact and, therefore, require contact to be broken for a set period of time to be considered a "true" lift-off. Such a requirement has the effect of appending proximity or non-contact points to the stroke, thereby distorting the stroke and making the input device appear noisy.

Proximity points can also be generated in the middle of a stroke (e.g., by the user's unintentionally breaking contact for a very brief period of time or by spurious sensor noise).

Figure 2:
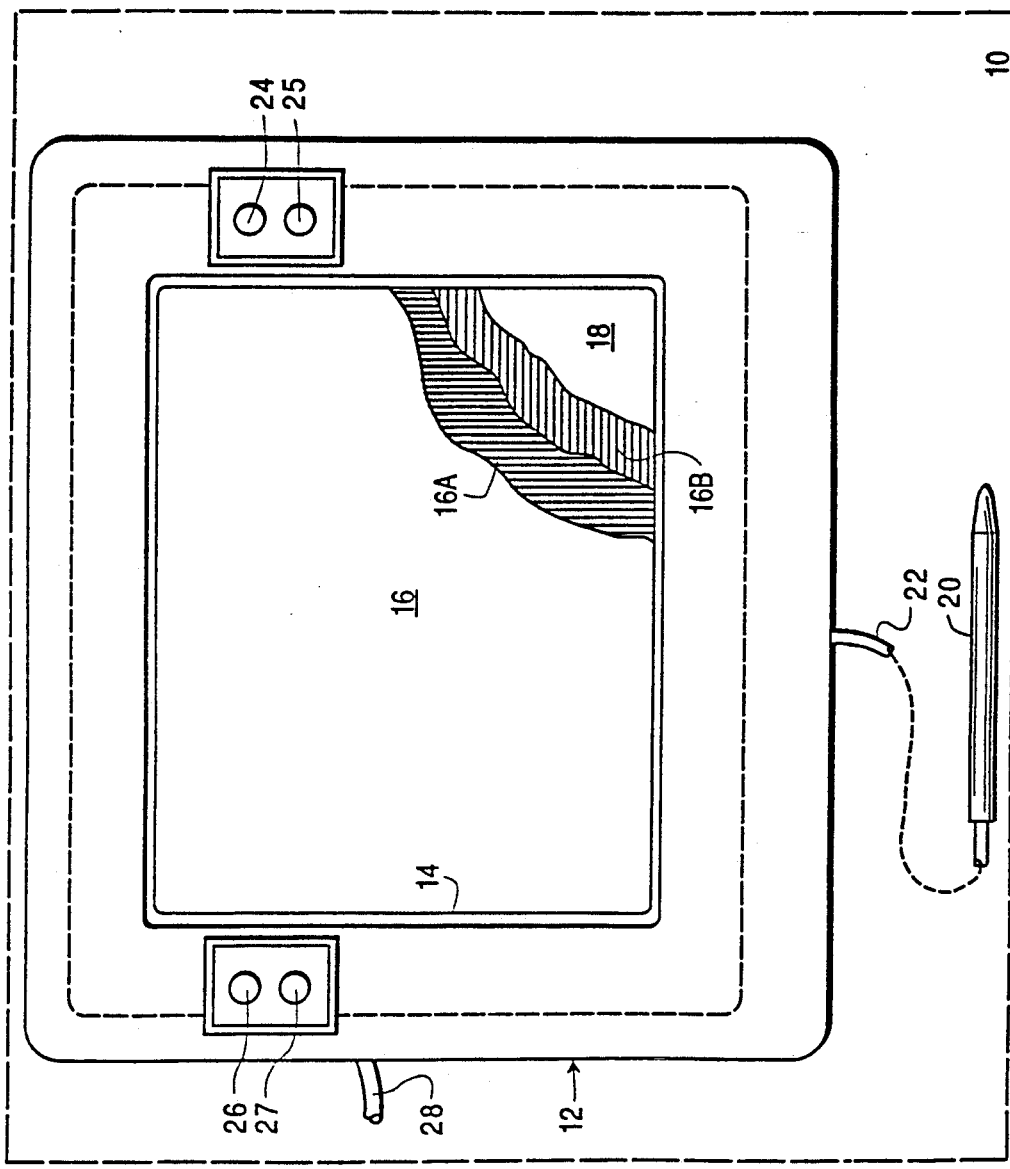
FIG. 2 shows the front view of an overlay used for the detection of a finger touch or a stylus position and disposed over a flat panel display, the entire assembly is referred to as a "touch workpad"

A touch input device known as a "workpad" is shown in FIG. 2. The workpad shown is similar to that described in commonly assigned co-pending application, Ser. No. 351,227 to Arbeitman et al., entitled "Flat Touch Screen Workpad for a Data Processing System", filed May 15, 1989, Which is hereby expressly incorporated herein by reference. The workpad 10 is composed of a housing 12 having a rectangular recessed window 14 which surrounds the edges of a rectangular touch overlay 16. The overlay 16 is transparent and is disposed on a liquid crystal display (LCD) 18. The overlay 16 consists of a laminate structure including several plastic substrate layers laminated together by means of adhesive layers. The overlay 16 also includes a first plurality of transparent conductors 16A disposed in the vertical direction and a second plurality of transparent conductors 16B disposed in the horizontal direction. Several of the conductors in both vertical and horizontal directions are positioned beyond the recessed window 14 to allow more accurate determination of a location of the stylus 20 or a finger on or near the overlay 16 at the edges of the display window 14.

A stylus 20 is connected by a cable 22 to the housing 12. The stylus 20 acts as an antenna to pick up the signals radiated by the overlay 16 via the plurality of conductors, and provides much greater resolution than can be provided by a finger touch as described in U.S Pat. Nos. 4,686,332 and 5,007,085. Four button switches 24–27 on the bezel of the housing can be used to change the mode in which the data from the workpad 10 is received. Workpad cable 28 is the connector between the workpad 10 and the computer With which the user is communicating. The workpad cable 28 provides power to the workpad 10, display signals to operate the LCD 18, and touch signals to operate the overlay in both finger touch and stylus modes. In addition, the cable 28 is the conduit to the computer for the measurement of the signal strength received by the stylus 20 and the frequency change detected due to changes in capacitance during a finger touch-down.

Figure 3:
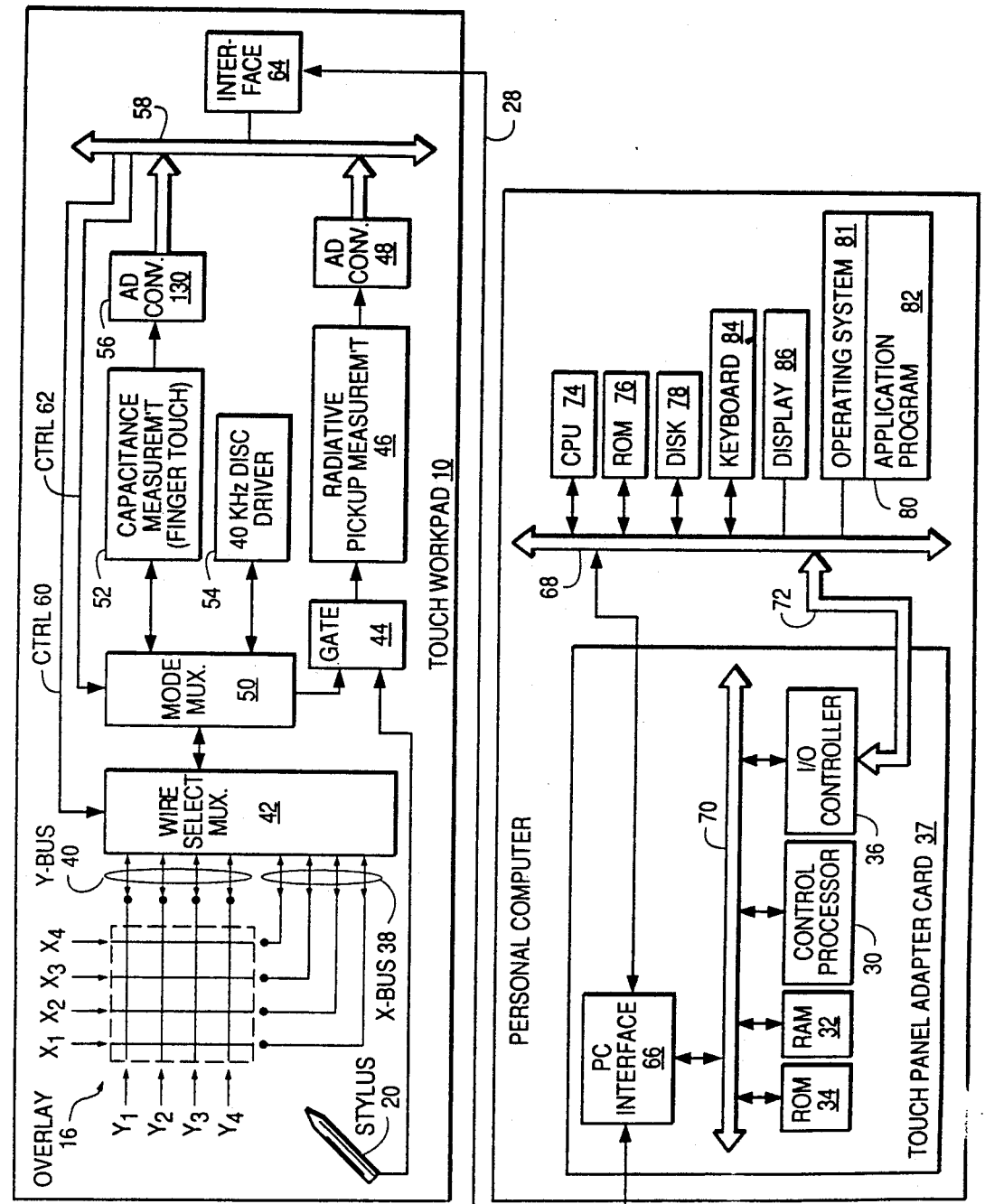
FIG. 3 shows an architectural diagram of a finger touch and stylus detection system used in accordance with the present invention.

FIG. 3 shows an architectural diagram of the finger touch and stylus detection system. The system depicted in FIG. 3 is similar to that disclosed in FIG. 9 of U.S. Pat. No. 4,686,332. The overlay 16, however, is constructed according to the principles of the present invention, and the stylus 20 is of the improved design disclosed in commonly assigned, co-pending application "Improved Stylus Sensing System" Ser. No. 07/608,072 to Greanias et al., filed Oct. 15, 1990, and hereby expressly incorporated herein by reference. Also, the touch control processor 30, random access memory 32, read only memory and the I/O controller 36 are on a touch panel adapter card 37 in a personal computer (PC), while the rest of the touch electronics are integrated in the touch workpad 10.

The touch workpad 10 communicates with the touch panel adapter card 37 via a cable 28. The vertical X conductors are connected through the X bus 38 and the horizontal Y conductors are connected through the Y bus 40 to the wire selection multiplexer 42. The radiative pickup stylus 20 is connected through the gate 44 to the radiative pickup measurement device 46. The wire selection multiplexer 42 is connected through the mode multiplexer 50 to the capacitance measurement device 52 which is used for capacitively detecting finger touch. The wire selection multiplexer 42 is also connected through the mode multiplexer 50 to the 40 kHz oscillator driver 54 which is used to drive the X bus 38 and the Y bus 40 for the stylus detection operation. The mode multiplexer 50 also produces an enabling output to the gate 44 to selectively connect the output of the stylus 20 to the radiative pickup measurement device 46 for stylus detection operations. The output of the capacitance measurement device 52 is connected through the analog-to-digital converter 56 to the workpad bus 58. The output of the radiative pickup measurement device 46 is connected through the analog-to-digital converter 48 to the bus 58. A control input 60 of the wire selection multiplexer 42 is connected to the bus 58, and the control input 62 of the mode multiplexer 50 also is connected to the bus 58.

The workpad bus 58 is connected via workpad interface 64 to the cable 28 which connects the touch pad 10 to the adapter card 37 via interface 66 which communicates with the main system bus 68 and with the adapter card bus 70. The I/O controller 36 has an I/O bus 72 which connects to the main bus 68 of the PC. The I/O controller 36 is also connected to adapter card bus 70 which interconnects the control processor 30 with the read only memory (ROM) 34 and with the random access memory (RAM) 32. The PC includes standard devices such as a CPU 74, ROM 76, disk storage 78, a memory 80 which stores operating system 81 and application program 82, a standard keyboard 84 and a standard display 86. The standard display 86 is typically a CRT, and in the preferred embodiment, the display is in addition to the LCD 18 included in the workpad 10.

In response to control signals applied over the control inputs 60 and 62 from the bus 58, the wire selection multiplexer 42 and the mode multiplexer 50 connect selected patterns of a plurality of the horizontal and vertical conductors in the overlay 16 to either the capacitance measurement device 52 or the 40 kilohertz oscillator driver 54. During finger touch operations, the capacitance measuring device 52 has its input coupled through the mode multiplexer 50 and the wire selection multiplexer 42 to selected signal conductors in the horizontal and vertical conductor array in the overlay 16, in response to control signals from the control processor 30. The output of the capacitance measurement device 52 is converted to digital values by the A/D converter 56 and is supplied over the bus 58 to the control processor 30. The control processor 30 executes a sequence of stored program instructions to detect the horizontal and vertical array conductor pairs in the overlay 16 which are being touched by the operator's finger.

The finger touch and stylus sensing modes operate independently of one another. The detection system cycles between the two modes until a finger touch or stylus is detected.

Commonly assigned, co-pending application Ser. No. 344,879, entitled "Advanced User Interface" filed Apr. 28, 1989, which is hereby expressly incorporated herein by reference, describes an operating system extension which allows new forms of input to be handled by software application programs which were not written to accept those forms of input. For example, most applications to date are written to accept only keyboard and mouse inputs. Thus, a user could use the Advanced User Interface (AUI) with a touch input device without modifying any of the application program codes. AUI is especially useful in a Graphical User Interface (GUI) operating system that is based on a metaphor of a desktop often having many windows or software applications displayed on the screen. As a user makes strokes on the desktop with a pointing device (e.g., stylus, finger, etc.), AUI displays an ink trail, simulating pen and paper, to provide feedback and aid the user in directing the stroke to the desired or target application.

As the user strokes the pointing device, a stream of point coordinates is generated by touch sensor hardware at a rate that is dependent on the type of pointing device used. For example, a stylus point rate of 120 p/s and a finger touch point rate of 60 p/s would result in a new point every 8 milliseconds (ms) and 16 ms, respectively, being received by the touch sensor. The rate at which points are generated sets an upper limit on the amount of time which AUI and the application have to process each individual point, so as to maintain a smooth and responsive ink trail.

Processing a point involves AUI's adding the point to the stroke buffer, inking the point, and passing it to the application for application-specific processing. This process can take up to 75% of the CPU overall processing time. For example, if the CPU takes more than 9 ms to complete the above process for each point, a finger pointing device generating new points every 9 ms would consume 100% of the CPU processing time. As a result, a substantial portion of the AUI's overall processing time will be devoted to processing point coordinate data.

A secondary result is that the operating system discards points if the target application is too busy to handle them. Known as "mouse move coalescing", the operating system passes the position of only the last point received from the input device (e.g., workpad) to the application. Points will, therefore, be discarded if the application does not retrieve them fast enough. In applications that specifically process point device data, the inability to retrieve points leads to a loss of user input data.

The AUI inking algorithm takes advantage of touch technologies that individually label points as contact or proximity points. Depending on the pointing device (e.g., stylus, finger, etc.), an ink divide rate is calculated such that inking occurs only on every nth point after a contact point is initially generated (i.e., at the time of touch-down). The rate of inking is set so that points are inked no fewer than 20 times per second. It has been determined through experimentation and testing that inking at a rate of at least 20 times per second provides substantial reduction in overhead while maintaining good inking performance. Inking at this rate keeps the inking delay or flicker imperceptible to the user and makes the ink appear as if it is flowing from directly underneath the tip of the pointing device. As points are received from the sensor, they are buffered until the nth point is received, at which time all buffered points are inked along with the current point. When the user breaks contact with the screen, all uninked contact points currently stored in buffer memory are immediately inked to complete the inking of the stroke.

As a user brings the pointing device, such as a stylus, into proximity with the sensor, the sensor gradually becomes able to resolve the exact location of the stylus and valid proximity points are generated. The proximity points received before contact are generally not used as input information. However, these proximity points are used to move the cursor on the display to keep it under the tip of the stylus. These proximity points are also made available to the software application.

When contact is made with the sensor, a touch down message is passed to the operating system and all points afterwards are labeled contact points.

When the user eventually lifts off the sensor, all points generated by the stylus after lift-off will again be labeled as proximity points. After a certain number of proximity points are received, a device driver will generate a lift-off message and pass it to the operating system.

Proximity points received after contact has been lost, but before the lift-off message is generated are considered a "tail" or noise, and these points are always removed from the stroke since ink should only flow when the stylus contacts the sensor.

Figure 4A:
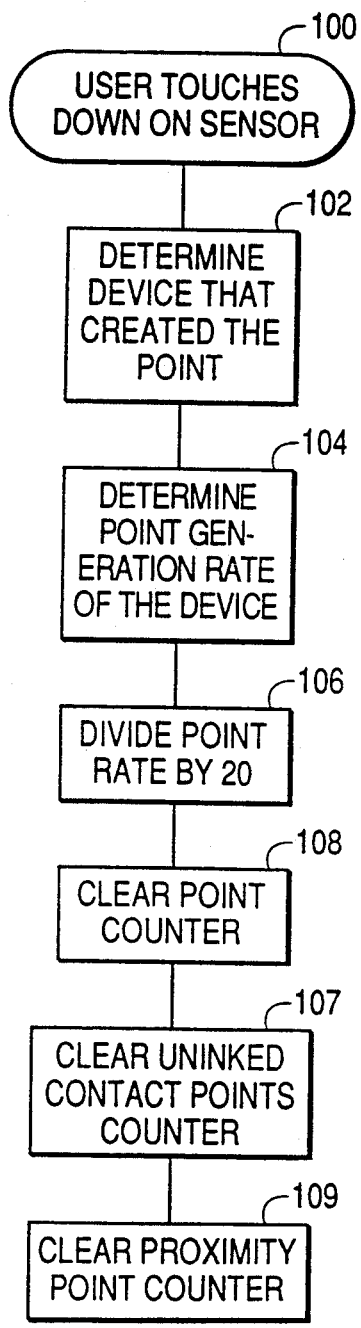
FIGS. 4A–4C are flow diagrams illustrating the operation of the present invention.
Figure 4C:
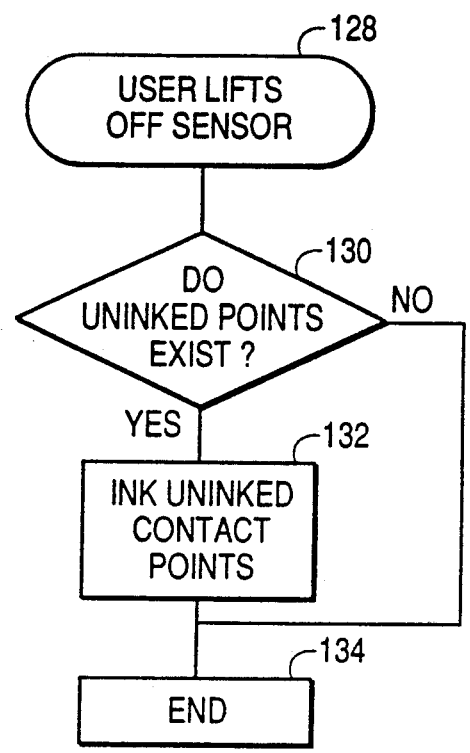
Figure 4B:
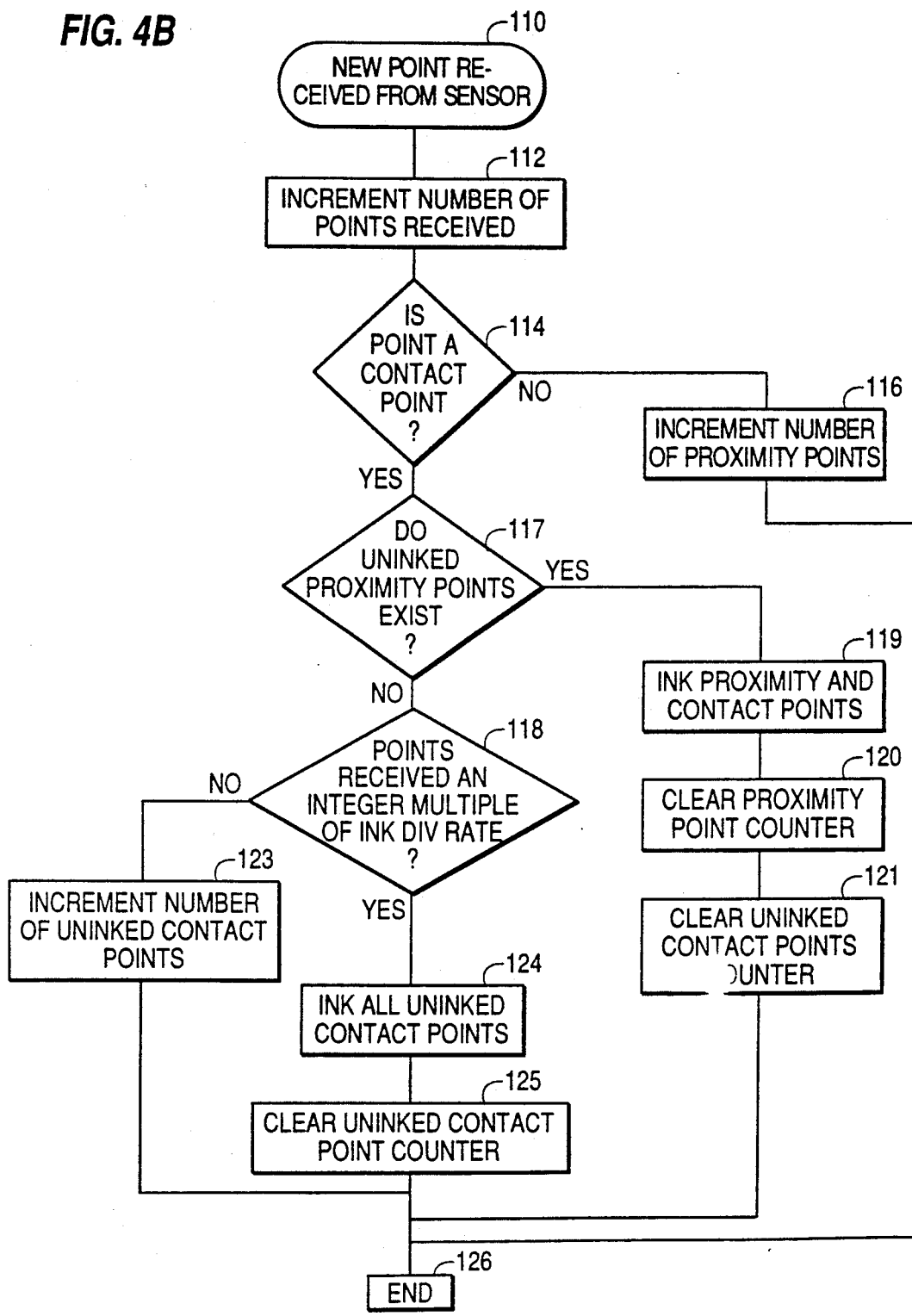

FIGS. 4A–4C are flow diagrams for the operation of the present invention. The operation begins in FIG. 4A when the user begins movement, such as a stylus touchdown on the overlay (box 100). The system determines the device that created the point (box 102); the device could be a stylus, finger, mouse, etc. In this example, it is a stylus. Once the device is identified, the point generation rate of the device is determined (box 104). For the stylus, 120 p/s are generated; for the finger, 60 p/s; and for the mouse, 40 p/s. The device point rate is then divided by 20, to make sure the stroke is inked at least 20 times per second (box 106) (hereinafter referred to as the "ink divide rate"). As discussed above, if the stroke is inked 20 times per second, the stroke is inked so quickly that the user thinks each point is inked as it is sensed, instead of every fifth or eighth point. The point counter is cleared to allow the system to track the points (box 108). The counters for uninked contact points and proximity points 109 are also cleared (boxes 107 and 109).

In FIG. 4B, a code is entered every time a new point is received from the touch sensor (box 110). The total number of points received thus far is incremented, i.e., the point counter is incremented (box 112). A determination is then made whether or not the point sensed is a contact point (box 114). As discussed above, a contact point is a coordinate generated when the stylus is actually touching the overlay sensor. If the point is not a contact point, it is classified as a proximity point, and the counter of proximity points is increased by one (as in box 116). If the point is a contact point, a determination is made where unlinked proximity points exist (box 117). If uninked proximity points do exist both the uninked proximity points and the contact points are inked (box 119) and the proximity and contact counters are cleared (boxes 120 and 121). Otherwise a determination is made whether the point is an exact multiple of the ink divide rate (box 118). As stated above, the ink divide rate is the number of points per second divided by 20. In the case of the stylus, inking occurs every six points. If the received points are not an integer multiple of the ink divided rate, the flow terminates at box 126. Otherwise, if only contact points exist, the contact points are inked. Then the flow terminates in box 126. Initially, if proximity points are detected, they are not inked; but, if contact points reoccur after the proximity points are detected, the system knows that the user broke contact or lifted up the pointing device only slightly, but probably unintentionally.

Occasionally, a random proximity point is generated in the middle of a stroke because the stylus momentarily broke contact with the sensor. This separation could be due to foreign matter such as a particle of dirt on the surface of the sensor, or possibly a shaky hand. Such a point can also be caused by a mis-calibrated or a noisy sensor. These separations of contact though are extremely brief, usually 1 or 2 points or 8–16 milliseconds. It is the responsibility of the device driver to distinguish between an actual, intentional lift-off and a spurious loss of contact. To do this, the device driver will usually not generate a lift-off message until n number of proximity points are generated. If n is too low, strokes may be broken or terminated before lift-off. If n is too high, a user may lift-off and begin the next stroke before enough proximity points are generated to terminate the first stroke. As a result, a ligature or the combination of the two strokes into a single stroke occurs. Both results, broken strokes and ligatures are highly undesirable.

The number of proximity points required to signal a lift-off message will differ according to the performance characteristic of any given sensor. In theory, a single proximity point should generate such a message to the software application. In practice this number may vary between 1 and as much as 6.

The inking routine of AUI therefore does not ink proximity points unless contact points are again received. If a lift-off message is received first, these proximity points are never inked and are later truncated from the stroke buffer. AUI must buffer the proximity points until it can be determined whether the loss of contact was spurious or intentional.

In FIG. 4C, the user lifts the stylus off the touch sensor overlay (box 128). The system checks to see if there are any uninked contact points existing in the buffer to complete inking the stroke (box 130). If there are uninked contact points, the system inks them (box 132).

The present invention thus described reduces by approximately 60 percent the processing overhead incurred while inking a stroke for some processors. The invention increases the efficiency of the operating system by causing it to ink several points at a time instead of a single point at a time. Further efficiency is gained since the amount of processing overhead incurred to prepare for inking and to complete inking is the same for several points as it is for a single point.

Figure 5:
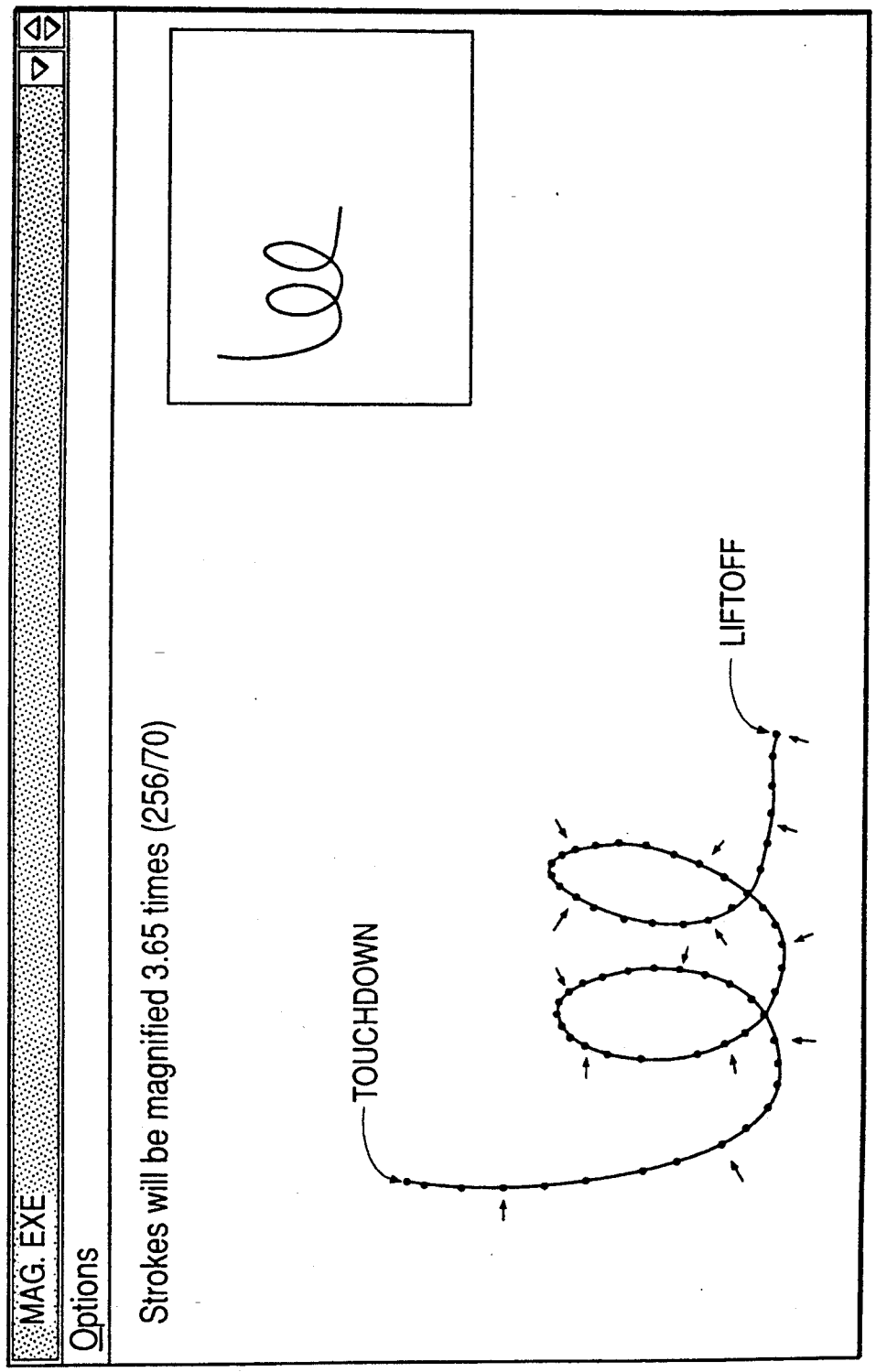
FIG. 5 is a representation of an inking stroke across the display and shows stylus touch-down and lift-off points.

FIG. 5 shows a stroke traced by a pointing device, such as a finger, from touch down to lift-off in accordance with the present invention. The small arrows are spaced every fifth point to show that on every fifth point the stroke is inked. This stroke (as depicted) was drawn by the user very rapidly. Normally, the points are much closer together. The inking occurs so quickly using the invention that it appears as if the ink is constantly underneath the tip of the pointing device. At lift-off, three points are left in the buffer after the last inking was performed. The system takes these uninked points from the buffer and inks them immediately.

Figure 6:
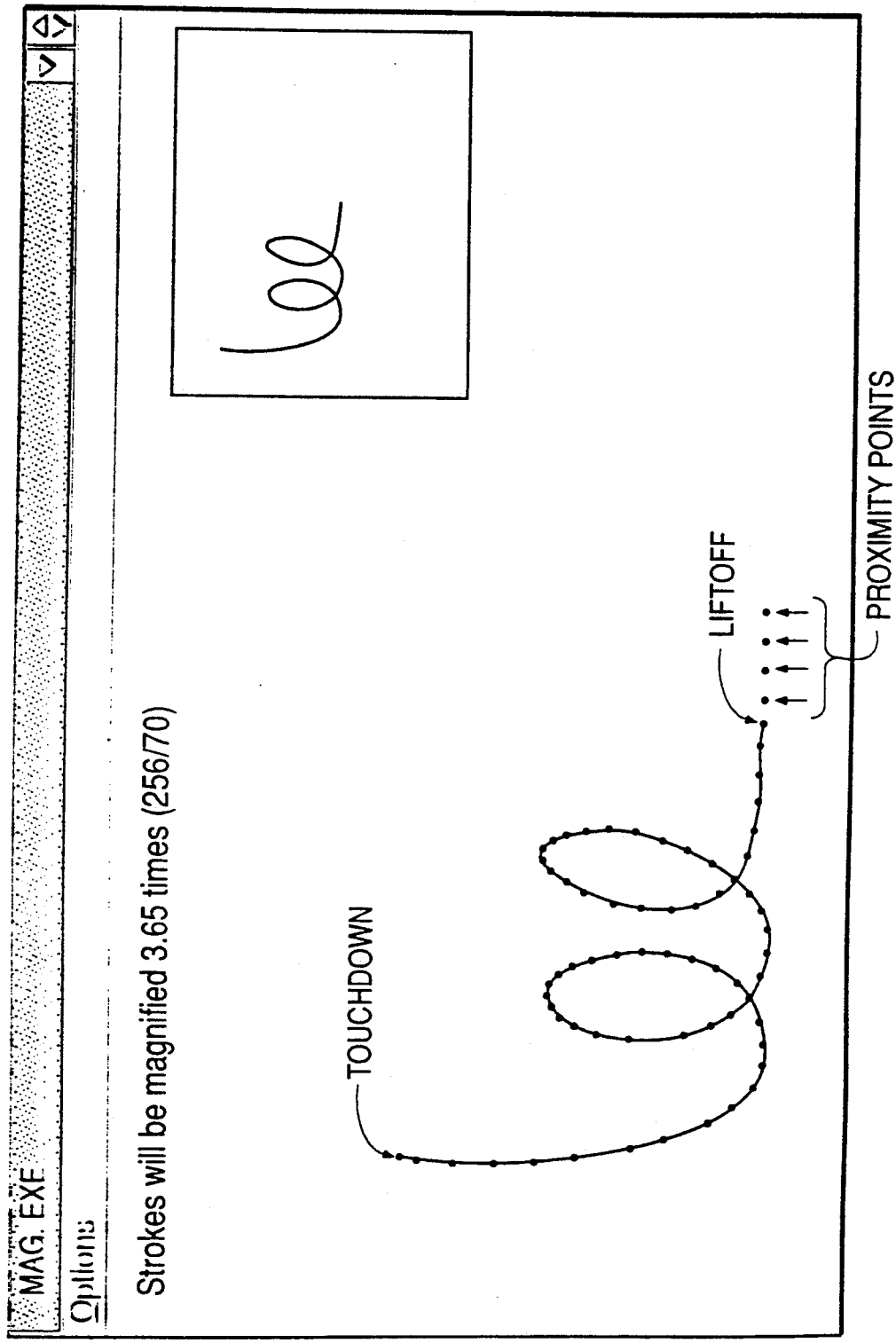
FIG. 6 is a representation of the inking stroke depicted in FIG. 5, and also depicts uninked proximity points sensed by the touch input device after stylus lift-off.

FIG. 6 shows the same stroke, but with a few proximity points at the end of the stroke that were sensed after lift-off. The stylus is near the overlay but not touching it. Thus, the system will generate coordinates which are determined to be proximity points. The proximity points at the end of the stroke are never used. The system is designed to emulate pencil and paper; thus, ink should only flow when the stylus or pen is actually contacting the sensor.

LOGIC FLOW

To clarify the above description, the following pseudocode is provided to detail the logic flow:

```
when a user touches down
    identify stroke device
    determine point rate
    calculate ink divide rate by dividing point rate by
    twenty (20)
    clear uninked contact point counter
```

```
        clear proximity point counter
    endwhen
    when a new point is received from the sensor
            increment number of points received in the stroke
            if point is a contact point
                    if no uninked proximity points exist
                            if number of points is an even multiple of
                            the ink divide rate
                                    ink all uninked contact points
                                    clear uninked contact point counter
                            else
                                    increment uninked contact point counter
                            endif
                    else
                            ink all uninked proximity contact points
                            clear uninked contact point counter
                            clear proximity point counter
                    endif
            else
                    increment number of proximity points received
            endif
    endwhen
    when user lifts off
            if uninked contact points exist
                    ink uninked contact points
    endwhen
```

Figure 7:
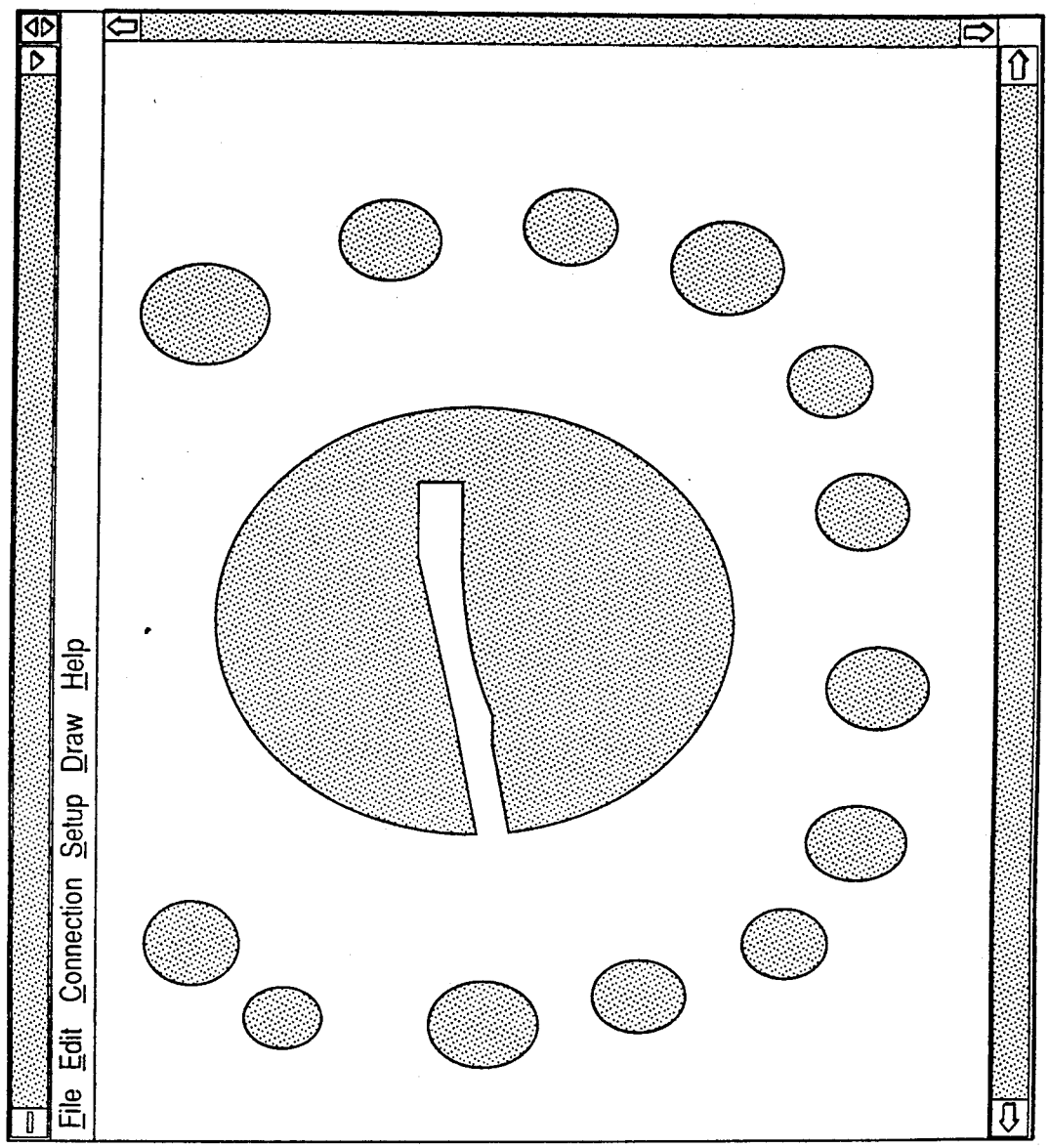
FIG. 7 is a representation of a graphic in which the stylus was used to erase a portion of the image.

FIG. 7 shows another embodiment of the invention to give the user the same correction capability as a pencil with an eraser. Prior art attempts at providing a stylus-based computer system with real-time erasing capability, such as that shown in the U.S. Pat. No. 4,633,436 to Flurry, suffer from the excess overhead that forces the display to lag behind the movement of the stylus, as discussed above.

The present invention reduces the overhead processing by storing a predetermined number of points corresponding to the position of a stylus as it moves on a workpad during an erasing procedure. As in the inking procedure discussed above, a predetermined number of points is stored in the buffer, wherein the predetermined number is dependent upon the type of pointing device (e.g., finger, stylus, etc.) used with the workpad. The stored points are inked in the same color as the background of the display. Thus, it appears as though the points are removed from the visual display. Inking in this manner is performed at a rate of at least 20 times per second. As a result, the user moving the pointing devices receives both tactile and visual feedback information similar to that provided by a pencil eraser used to erase markings on a piece of paper.

While the invention has been particularly shown and described with reference to a preferred embodiment thereof, it will be understood by those skilled in the art that various changes in detail may be made therein without departing from the spirit, scope and teaching of the invention.

Having thus described my invention, what I claim as new, and desire to secure by Letters Patent is:

1. In a data processing system, a method for displaying a sequence of points representing a writing path of a pointing device, comprising the steps of:

receiving a contact signal from a pointing device, indicating that the pointing device has started a writing path;

starting a counter in said data processing system to count the receipt of coordinate value signals from the pointing device;

receiving a first sequence of said coordinate value signals from the pointing device describing a first sequence of points traversed by said pointing device along said writing path;

counting said coordinate value signals received in said first sequence and outputting an enabling signal when a predetermined number of said signals in said first sequence have been counted;

storing said first sequence of coordinate value signals in said data processing system until said counter outputs said enabling signal;

displaying said first sequence to points on a display device in said data processing system in response to said enabling signal;

receiving a second sequence of said coordinate value signals from the pointing device describing a second sequence of points traversed by said pointing device along said writing path;

storing said second sequence of coordinate value signals in said data processing system;

receiving a contact termination signal from said pointing device, indicating that the pointing device has terminated said writing path;

displaying said second sequence of points on said display device in said data processing system in response to said termination signal.

2. The method of claim 1, which further comprises the steps of:

after the step of receiving a contact signal from a pointing device, indicating that the pointing device has started a writing path, the step of:

identifying said pointing device from a plurality of pointing devices in said data processing system;

accessing a predetermined value for said predetermined number of signals to be counted, in response to identifying said pointing device.

3. In a data processing system, a method for removing a sequence of points displayed which represent an erasing path of a pointing device, comprising the steps of:

receiving a contact signal from a pointing device, indicating that the pointing device has started an erasing path;

starting a counter in said data processing system to count the receipt of coordinate value signals from the pointing device;

receiving a first sequence of said coordinate value signals from the pointing device describing a first sequence of points traversed by said pointing device along said erasing path;

counting said coordinate value signals received in said first sequence and outputting an enabling signal when a predetermined number of said signals in said first sequence have been counted;

storing said first sequence of coordinate value signals in said data processing system until said counter outputs said enabling signal;

erasing said first sequence of points on a display device in said data processing system in response to said enabling signal;

receiving a second sequence of said coordinate value signals from the pointing device describing a second sequence of points traversed by said pointing device along said erasing path;

storing said second sequence of coordinate value signals in said data processing system;

receiving a contact termination signal from said pointing device, indicating that the pointing device has terminated said erasing path;

erasing said second sequence of points on said display device in said data processing system in response to said termination signal.

4. The method of claim 3, which further comprises the steps of:

after the step of receiving a contact signal from a pointing device, indicating that the pointing device has started an erasing path, the step of:

identifying said pointing device from a plurality of pointing devices in said data processing system;

accessing a predetermined value for said predetermined number of signals to be counted, in response to identifying said pointing device.

5. A data processing system for displaying a sequence of points representing a writing path of a pointing device, comprising:

first means for receiving a contact signal from a pointing device, indicating that the pointing device has started a writing path;

a counter in said data processing system, coupled to said first receiving means, for counting the receipt of coordinate value signals from the pointing device;

second means for receiving a first sequence of said coordinate value signals from the pointing device describing a first sequence of points traversed by said pointing device along said writing path;

said counter coupled to said second receiving means, for counting said coordinate value signals received in said first sequence and outputting an enabling signal when a predetermined number of said signals in said first sequence have been counted;

means for storing said first sequence of coordinate value signals in said data processing system until said counter outputs said enabling signal;

means for displaying said first sequence of points on a display device in said data processing system in response to said enabling signal;

said second receiving means receiving a second sequence of said coordinate value signals from the pointing device describing a second sequence of points traversed by said pointing device along said writing path;

said storing means storing said second sequence of coordinate value signals in said data processing system;

means for receiving a contact termination signal from said pointing device, indicating that the pointing device has terminated said writing path;

said displaying means displaying said second sequence of points on said display device in said data processing system in response to said termination signal.

6. The system of claim 5, which further comprises:

identifying means coupled to said first receiving means, for identifying said pointing device from a plurality of pointing devices in said data processing system;

means coupled to said identifying means, for accessing a predetermined value for said predetermined number of signals to be counted, in response to identifying said pointing device.

* * * * *